UNITED STATES PATENT OFFICE.

HENRIK JANSON BULL, OF BERGEN, NORWAY, ASSIGNOR TO A/S DE NORSKE SALTVERKER, OF BERGEN, NORWAY.

TREATMENT OF LIQUIDS CONTAINING SULFATE OF LIME.

1,399,845.  Specification of Letters Patent.  Patented Dec. 13, 1921.

No Drawing.  Application filed July 24, 1919. Serial No. 313,058.

*To all whom it may concern:*

Be it known that I, HENRIK JANSON BULL, a subject of the King of Norway, residing at Bergen, Norway, have invented certain new and useful Improvements in the Treatment of Liquids Containing Sulfate of Lime; and I do hereby declare the following to be a full, clear, and exact description of the invention, such as will enable others skilled in the art to which it appertains to make and use the same.

The present invention relates to the treatment at elevated temperatures of liquids which contain calcium sulfate of lime and has for its object to prevent the formation of layers of calcium sulfate on the heating surfaces. The invention more especially has for its object to prevent the formation of such layers during evaporation processes for instance in the production of common salt but it is applicable to any other heat treatment of liquids—such as water, sea water, salines—which contain sulfate of lime or substances from which this salt could be formed in the course of the treatment.

As known it has been a great nuisance in connection with the treatment of liquids of the nature referred to that a considerable part of the sulfate of lime has separated out on the heating surfaces with the consequence that the efficiency of these latter is rapidly lowered. In order to keep the heating surfaces as free as possible from this gypsum precipitate, the socalled scale, it must be removed from time to time by mechanical means, and this again involved the use of open evaporating pans of a low caloric efficiency as the scale also necessitates frequent repairs of the evaporating elements. These circumstances have rendered it impossible to use evaporation processes of a greater heat economy because all such processes involve the use of closed apparatuses.

For these reasons it has also been suggested to bring about a precipitation of the gypsum or the gypsum forming salts previous to the evaporation, an addition of slaked lime having for instance been used for this purpose.

A study of the conditions under which the formation of the gypsum bearing layers on the heating surfaces takes place has shown that the separation of gypsum from the solution, super-saturated as to this substance, is particularly liable to take place when a layer of gypsum is already present, in other words that the crystallization is promoted by the presence of suitable crystallization kernels and as such kernels, ready crystals act much more strongly than the metal surfaces. Experiments have shown that when crystals of gypsum (sulfate of lime) in sufficient number are suspended in the treated liquid, the precipitation of new crystals will take place only on these crystals as kernels and not upon the metal parts.

In accordance with this observation the present invention is now characterized therein, that the evaporating is carried into effect in the presence of a suitable quantity of gypsum crystals suspended in the liquid, a motion being maintained in the liquid strong enough to prevent an injurious coalescence of the crystals so that the formed crystals—which as known are in the form of long needles—are broken into pieces by impinging upon the solid parts of the apparatuses during the movement of the liquid.

The practical execution of the invention may take place in different ways and will in part be dependent upon the special conditions and of the nature of the evaporation process employed. Common to all the various embodiments of the invention is that gypsum crystals are present in sufficient quantity in the liquid before the liquid by the evaporation has reached the state of a super-saturated gypsum solution.

The invention may be carried into effect in the manner that gypsum crystals are directly added to the treated liquid. If the process is not of a continuous nature gypsum crystals will be present in the solution after each evaporation operation in such quantity that a part of these crystals may be used as mother crystals or kernels in the next evaporation operation. If the process is a continuous one a quantity of lye and of gypsum may be constantly removed by a pumping arrangement simultaneously with the supply of new quantities of a weaker salt solution.

A method which under certain conditions will be suitable consists in adding a solution of slaked lime in water instead of directly introducing gypsum crystals into the liquid. I have found that by gradually adding lime water to the boiling salt solution there is rapidly formed a sufficient quantity of gypsum crystals suspended in the solution, so that the addition of lime water can then be interrupted. When sea water is treated the obtained lye contains considerable quantities of salts of magnesia partly as chlorid and partly as sulfate. As to the magnesium sulfate the reaction with lime water may be illustrated by the equation:

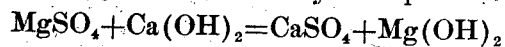
$$MgSO_4 + Ca(OH)_2 = CaSO_4 + Mg(OH)_2$$

The explanation of the fact that the lime water effects the formation of gypsum crystals in the solution which is saturated in gypsum may be a double one. On the first hand it is to be presumed that the gypsum formed in accordance with the above equation must effect the formation of a supersaturated gypsum solution at the places where the lime water enters, with the consequence that gypsum is separated out. On the other hand it might quite well be assumed that the magnesium hydroxid which separates in a very finely divided condition act as crystallization kernels for the gypsum in the lye. With regard to the merits of the case it is however of no consequence which of these explanations is the correct one. The main point is that the addition of lime water constitutes a useful means to inoculate or seed the boiling salt solution with the sufficient quantity of small gypsum crystals, so that these latter will play the part which initially was taken over by the lime water. As regards the quantity of the addition of lime water 1 kg. of lime will be sufficient to 10000 liters of lye (from sea water). As above explained the lime in this case plays a part only as a means to initiate the formation of seed crystals (kernels) of gypsum and could be substituted for by other means serving for the same purpose.

The addition of lime water to water or salines in connection with evaporation processes is not in itself novel, this measure having been made use of for the purpose of separating calcium carbonate. The object of this addition of lime water has not been however to produce crystals of calcium sulfate in the evaporator in such manner as to attain the result aimed at by the present invention viz. the avoidance of gypsum layers in the evaporator by the action of gypsum crystals uniformly suspended in the solution. According to the known method the lime water has been added to the treated liquid in separate vessels outside of the evaporator whereupon the greatest possible amount of the produced crystals has been separated by filtration or sedimentation. Moreover according to this known treatment no steps have been taken to prevent the gypsum crystals which may enter the evaporator from settling. The motion in the liquid produced solely by the formation of steam bubbles and which has not by suitable constructions and suitably dimensioned sectional areas been properly conducted and utilized is not sufficient to prevent such settling or sedimentation in the evaporator for instance when the liquid has a downward motion. To attain the object of the present invention it is necessary by special means to maintain the liquid as a whole in motion in such manner as to cause suspended gypsum crystals to be present throughout the whole quantity of liquid without any possibility of settling.

Claims:

1. In the evaporation of liquids containing calcium compounds, the method of preventing the formation of incrustations containing calcium sulfate on the evaporating surfaces, which comprises causing crystals of calcium sulfate to be suspended in the liquid being evaporated and substantially saturated as to calcium sulfate in sufficient quantity to take up the calcium sulfate separated from the solution during evaporation.

2. In the evaporation of liquids containing calcium compounds, the method of preventing the formation of incrustations on the evaporating surfaces, which comprises seeding the solution to be evaporated and substantially saturated as to calcium sulfate with calcium sulfate crystals and maintaining the solution in motion during evaporation.

3. In the evaporation of liquids containing calcium compounds, the method of preventing the formation of incrustations containing calcium sulfate which comprises forming within the body of the solution to be evaporated and substantially saturated as to calcium sulfate seed crystals of calcium sulfate by chemical reactions.

In testimony that I claim the foregoing as my invention, I have signed my name in presence of two subscribing witnesses.

HENRIK JANSON BULL.

Witnesses:
CAY ROLL-HANSEN,
EILIF WOLFF PAULSON.